United States Patent Office 3,513,894
Patented May 26, 1970

3,513,894
PROCESS FOR THE REMOVAL OF THE PEEL OF POTATOES OR OTHER TUBERS, BULBS, ROOTS, FRUITS OR SIMILAR VEGETABLE PRODUCTS
Cornelis van Gorkom, Wageningen, Netherlands, assignor to Instituut voor Bewaring en Verwerking van Landbouwprodukten, Wageningen, Netherlands, a Dutch society of the Netherlands
No Drawing. Filed Mar. 18, 1968, Ser. No. 714,042
Claims priority, application Netherlands, Mar. 28, 1967, 6704420
Int. Cl. A23n 7/02
U.S. Cl. 146—226       6 Claims

ABSTRACT OF THE DISCLOSURE

Peel-carrying vegetable products such as tubers, roots, bulbs and fruit, are peeled by being first treated with lye, or steam and then with previously prepared powdered dried peel followed by screening and washing. The added dried peel removes the softened peel or skin from the vegetable and finely divides it so that it is carried through the screen to leave the peeled or skinned fruit etc., behind.

---

The invention relates to a process for the removal of the peel of potatoes or other tubers, bulbs, roots, fruits, or similar vegetable products, which peel has been softened in a way known per se by treatment with lye or steam.

For the removal of the peel of the said vegetable products on an industrial scale it is known first to soften and loosen the peel by treatment with lye or soda or with steam. By his treatment the material of the peel will swell, and it is softened and detached from the subjacent texture, but the peel a first remains intact as a more or less coherent, tough layer. This is the case in particular when the products are treated with steam, when the peel remains tougher than upon treatment with lye. After the treatment with lye or steam the tough, slimy, swollen peel is removed by spraying with water.

The U.S. Ser. No. 640,057 filed May 22, 1967, now Pat. No. 3,460,162, by Pieter H. Sijbring describes an apparatus with which it is possible to remove the peel previously softened with lye or steam without any extra addition of water. In this way a considerable quantity of water indeed is saved, but a difficulty is sometimes formed by the discharge of the slimy waste material of the peels. In the case of a previous treatment with steam it is possible to use the waste material directly as fodder, because it does not contain any inorganic substance and the starch present in it has been gelatinized by the steam treatment and is thus readily digestible. When this possibility does not exist and also when the material has been previously treated with lye, there is no suitable possibility for the discharge of the waste material. The waste material can be dried and burned, but the drying of the slimy mass is not a simple process.

It has now been found that the difficulty described above is avoided when the vegetable products treated with lye or steam are mixed with dried peel residues having an indicating number $d'$ of the granule size according to E. Puffe of less than 4.0 mm. and a uniformity coefficient $n$ of the granule size according to E. Puffe of 1.0 to 4.0, and the peel residues are subsequently separated off by screening, the quantity of dried peel residues added being such that the material passed by the sieve consists as to at least 65% by weight of added dried peel residues. With products having a content of dry matter of 15–25% by weight, such as potatoes, the material passed by the sieve preferably consists as to 80–90% by weight of added dried peel residues; with products having a content of dry matter of 5–15% by weight this quantity is preferably 88–98% by weight. According as the products, and consequently the peel material to be removed, have a lower content of dry matter, a larger quantity of dry peel material will be required to absorb the moisture of the softened peel material.

The "indicating number" $d'$ of the granule size and the "uniformity coefficient" $n$ by E. Puffe are concluded from the Rosin-Rammler equation.

This Rosin-Rammler equation is a statistical law concluded from theoretical probability considerations. This statistical law describes the particle size distribution of powders obtained by grinding.

This Rosin-Rammler equation is presented by:

$$R = 100 \cdot e^{-\left(\frac{d}{d'}\right)^n}$$

wherein
$R$ = the quantity of all the material in percent by weight that stays on a screen with openings of size $d$;
$e$ = base of natural logarithms;
$d$ = see definition of R;
$d'$ = indicating number of the granule size;
$n$ = uniformity coefficient.

As can be seen by this Rosin-Rammler equation the particle size distribution of a powder, obtained by grinding, is completely described by the value of $d'$ and $n$.

E. Puffe has given a simple method to determine $d'$ and $n$ from the data obtained by a normal sieve analysis.

Vegetable products to be treated according to the invention may be tubers, such as potatoes, sweet potatoes, batatas, kohlrabies and turnips, roots, such as carrots, beets, and parsnips; bulbs, such as onions; fruits, such as apples, pears, peaches, apricots, gherkins, tomatoes, quince pears, paprikas, and red peppers.

The invention is further described with reference to the treatment of potatoes.

The mixing with the dried peel residues takes place efficiently in a mixer which does not disintegrate the potatoes, but exerts a sufficient mechanical influence to remove the peel. Thus one may use a trough in which rotates a shaft with blunt arms or with brushes. A mixing drum, in which members exercising friction are present, is also suitable. If such an apparatus is used without dried peel material having been added, it is not possible to loosen the peel sufficiently from the potatoes. The mixing only has to take a short time, viz a few minutes, in order to attain the desired effect. By the mixing operation the surface of the potatoes is brought into intensive contact with the dried peel material, as a result the swollen peel is rubbed off the potatoes and forms a rather loose mass with the added dry peel material. Owing to the fact that the potatoes from which the peel has been removed have a moist and sticky surface, the loose mixture will adhere to the potatoes, so that they have a crumbed appearance. Nevertheless it was found possible to separate the peel residues practically quantitatively from the potatoes by means of a screening treatment, e.g. with a vibrating, shaking, or brusing sieve. The larger part of the waste material at once passes through the sieve, and after a few minutes also the powder adhering to the moist surface of the potatoes has been completely removed. In order to be completely cleaned, the potatoes thus peeled are finally washed with water. In this process at the same time the alkalinity of the surface, if the peel was softened with lye, is neutralized. For this only about 8 cubic meters of water per ton of potatoes is required, while for the spraying of the peel softened with lye or steam about 20 cubic meters/ton is required. It is also very important that the washing liquor contains only small quantities of organic material as compared with the water in which the peels are entrained when sprayed. In the latter case the B.O.D. is about 300 with a water consumption of 20 cubic meters/ton of potatoes, whereas that of the washing liquor in the process according to the invention is about 80 with a water consumption of 8 cubic meters/ton of potatoes. The process thus implies a considerable saving of water and a considerably lower degree of fouling of the waste water.

In carrying out the process it is important to ensure that the dried ground peel residues to be used are not too coarse, so that they can withdraw sufficient moisture from the rubbed fresh peel material during the short mixing period. It is obvious that the dry powder may be coarser according as a larger quantity of it is used, because the absorption of water from the rubbed peel residues is a process taking place in the first instance on the surface of the dry particles. It has been found that the indicating number $d'$ of the granule size according to E. Puffe must be smaller than 4.0 mm. It is preferably between 0.3 and 2.5 mm. The uniformity coefficient $n$ of the granule size according to E. Puffe is preferably between 1.5 and 3.0. A powder with an indicating number of the granule size smaller than 0.3 mm. can indeed be used, but in general is not so attractive on account of the risk of dusting. The terms "indicating number of the granule size" and "uniformity coefficient of the granule size" have been described by E. Puffe in Erzmetall, 1, 97–103 (1948).

The process can be carried out very economically as follows:

The peel material obtained by screening is dried, e.g. in a rotary drying drum. At least 90% by weight of the dried peel material is ground and returned to the process to be mixed with the next batch with a swollen peel. In the case of products having a content of dry matter of 15–25% by weight preferably 95–98% by weight of the dried peel material is returned, in the case of products having a content of dry matter of 5–15% by weight this is preferably 97–99.5% by weight. The remaining quantity is burned when the peel residues are due to a previous treatment with lye. In this case the liberated heat of combustion, dependent on the content of dry matter of the peeled product, is entirely or partly sufficient for drying the somewhat moist peel material passed by the sieves. When the peel residues are due to a previous treatment with steam, it is more economical to discharge the non-returned portion of the dried peel material as fodder.

It is efficient to carry out the mixing of dry peel material with potatoes having a swollen peel and the screening of the mixture thus obtained in one and the same apparatus or in adjacent parts of the same apparatus. For this purpose one may use, for instance, a trough-shaped tank in which rotates a shaft provided with brushes, which mixes the potatoes with the dry powder and conveys them in the longitudinal direction of the tank, the last part of the trough being provided with a wall constructed as a sieve.

It was not to be expected that by mixing of dry, finely divided peel material the swollen slimy peel would be completely removed and absorbed. After treatment with steam in particular, but also after treatment with lye, the peel still has considerable cohesion. The cork cells of potato peels are not greatly damaged, even though they do swell. The peel has, as it were, been lifted from the subjacent texture because the epidermis has been attacked. During the mechanical transport in the lye peeler the swollen peel is hardly damaged. Further it is striking that the potatoes remain behind in a clean condition upon screening.

In chemical technology screening is normally used to separate a mixture into coarse and fine particles. It is surprising that in the process according to the invention the particles adhering to the surface of the potatoes are loosened and discharged by the screening operation and that the sieve does not become clogged in the process.

The recycling of screened material is known per se in technology. Thus in Food Technology 7, 177–181 (1953) a process for the production of dehydrated granules of cooked potatoes is described, in which a given fraction of the dried product is fed back to the mass to be dried. In this case the dry product, which is mixed homogeneously through the mass to be dried, serves to improve the flow characteristics of the material to be dried, so that it can easily be dried. In the process according to the invention the added dry material has a double function, viz in the first place that of loosening the tough, sticky peel from the surface of the vegetable products and in the second place that of improving the flow characteristics of the separated peel residues, so that they can be readily discharged.

It is an additional advantage of the process according to the invention that the vegetable products, to attain the same peeling effect, have to remain in the lye peeler for a shorter time than when the softened peel is sprayed with water. In consequence of this the production capacity of this apparatus is increased by 30 to 50%.

EXAMPLE I 100 kg. of potatoes of the Libertas variety were washed in a potato-washing apparatus and subsequently immersed for 4 minutes in a lye peeler in 20% sodium hydroxide solution with a temperature of 66° C. After the potatoes had been taken from the lye, they were transferred to the mixing bowl of a planetary-type mixer, together with 100 kg. of dried, finely divided peel residues of potatoes treated with lye. The powder had an indicating number of the granule size of 0.5 mm. and a uniformity coefficient of 2.0. The shape of the dough hook of the planetary-type mixer had been so adapted that the potatoes were not damaged during mixing. The mixing took 2 minutes. After this, the contents of the mixer were transferred to a shaking sieve, and the powder with the peel residues was separated from the potatoes. The potatoes from which the peel had been removed were washed with water in a washing machine for subsequent cleansing and neutralization. 81 kg. of clean potatoes were left. The material passed by the sieve, which had a moisture content of 20.2% by weight, was dried in a drying drum to a moisture content of 10.0% by weight. In this way 105 kg. of dry material were obtained, of which, after grinding, 100 kg. were used again for the next charge and 5 kg. were burned to supply the heat for drying the material passed by the sieve. The residue left after combustion consisted of fairly pure soda and could be discharged and used as such.

EXAMPLE II 100 kg. of potatoes of the Bintje variety were washed in a potato-washing mechine and subsequently transferred to a steam chamber. Then steam was blown into the chamber until the pressure was 8 kg./cm.$^2$ gauge. When this pressure had been maintained for 50 seconds, the pressure was reduced and the potatoes were transferred from the steam chamber to a mixer, consisting of a trough in which a shaft with blunt arms was rotating. Simultaneously with the potatoes, 120 kg. of dried ground peel residues of potatoes peeled with steam were introduced into the mixer. This material had an indicating number of the granule size of 0.7 mm. and a uniformity coefficient of 1.8. The mixing took 1.5 mins. After this, the contents of the mixer were transferred to a shaking sieve and the powder with the peel residues was separated from the potatoes. For further cleansing, the potatoes were washed with water in a washing machine. 79 kg. of clean potatoes were left. The material passed by the sieve, which had a moisture content of 20.1% by weight, was dried in a drying drum to a moisture content of 11.0% by weight. In this way 126 kg. of dry material were obtained, of which, after grinding, 120 kg. were used again for the next charge and 6 kg. were discharged to serve as fodder.

EXAMPLE III 100 kg. of carrots of the Amsterdamse Bak variety were washed in a washing machine and subsequently immersed for 18 seconds in a lye peeler in 18% sodium hydroxide solution with a temperature of 78° C. When they had been taken from the lye solution, they were transferred to a mixing drum, together with 80 kg. of dried, finely divided peel residues of carrots treated with lye. The powder had an indicating number of the granule size of 0.6 mm. and a uniformity coefficient of 1.3. The mixing took 70 seconds, after which in the second part of the same mixing drum the carrots were separated from the peel remnants. In order to make this separation possible, the wall in the second part of the mixing drum consisted of wire gauze. For further cleansing, the carrots were washed with water in a washing machine. 82 kg. of clean carrots were left. The material passed by the sieve had a moisture content of 23.6% and was dried in a drying drum to a moisture content of 10%. In this way 82.3 kg. of powder were obtained. Of this, after grinding, 80 kg. were used again for the next charge and 2.3 kg. were burned. The combustion yielded 39% of the heat required for drying the material passed by the sieve. The residue of the combustion consisted of fairly pure soda and could be discharged as such.

EXAMPLE IV 100 kg. of apples of the Golden Rennet variety were washed and then immersed for 6 mins. in 16% lye of 58° C. When the apples had been taken from the lye solution, they were mixed with 100 kg. of peel residues in powdered form of apples treated with lye. The powder had an indicating number of 0.4 mm. and a uniformity coefficient of 2.5. The mixing took 75 seconds in a mixing drum. After this, the material was screened on a shaking sieve and subsequently the apples were washed. 86 kg. of clean apples were obtained. The moisture content of the material passed by the sieve was 19.9% by weight. After drying, 101.5 kg. of powder with a moisture content of 10% by weight was obtained. Combustion of 1.5 kg. of this powder yielded 29% of the heat required for drying the material passed by the shaking sieve. The remaining 100 kg. of powder were used again for the next charge.

I claim:

1. A method of peeling peel-carrying vegetable products selected from tubers, bulbs, roots and fruit which comprises softening the peel by treating it with steam or lye and then mixing the vegetable product so treated with previously prepared dried peel residues having an indicating number ($d'$) of the granule size, according to E. Puffe, of less than 4.0 mm. and a Puffe uniformity coefficient ($n$) of 1.0 to 4.0, then separating the resulting peeled product from the peel residues by screening, the quantity of dried peel residues employed being such that at least 65% of the material passing through the screen consists of the dried peel residues employed.

2. The method of claim 1 which comprises treating a vegetable product having a solids content of 15% to 25% by weight with said dried peel residues in an amount such that the material passed by the screening consists of 80% to 90% by weight of said added dried peel residues.

3. The method of claim 1 which comprises treating a vegetable product having a solids content of 5%–15% by weight with said dried peel residues in an amount such that the material passed by the screening consists of 88% to 98% by weight of said added dried peel residues.

4. The method of claim 1 wherein the dried peel residues employed have a Puffe indicating number ($d'$) of the granule size of 0.3 to 2.5 mm.

5. The method of claim 4 wherein the dried peel residues employed have a Puffe uniformity coefficient ($n$) of the granule size of 1.5 to 3.0.

6. The method of claim 5 wherein the vegetable product so treated is potatoes.

References Cited

UNITED STATES PATENTS

| | | | |
|---|---|---|---|
| 166,992 | 8/1875 | Lachicotte | 146—221.6 |
| 493,509 | 3/1893 | Menge | 146—221.6 |

W. GRAYDON ABERCROMBIE, Primary Examiner

U.S. Cl. X.R.

146—221.6, 233, 231